Jan. 16, 1962  F. RAIDL  3,016,740
TURRETED HEADSTOCK FOR TRANSMISSION TEST STANDS
Filed Dec. 7, 1959  2 Sheets-Sheet 1

INVENTOR.
FRANK RAIDL.
BY
*MK Murphy*
ATTORNEY

Jan. 16, 1962 F. RAIDL 3,016,740
TURRETED HEADSTOCK FOR TRANSMISSION TEST STANDS
Filed Dec. 7, 1959 2 Sheets-Sheet 2
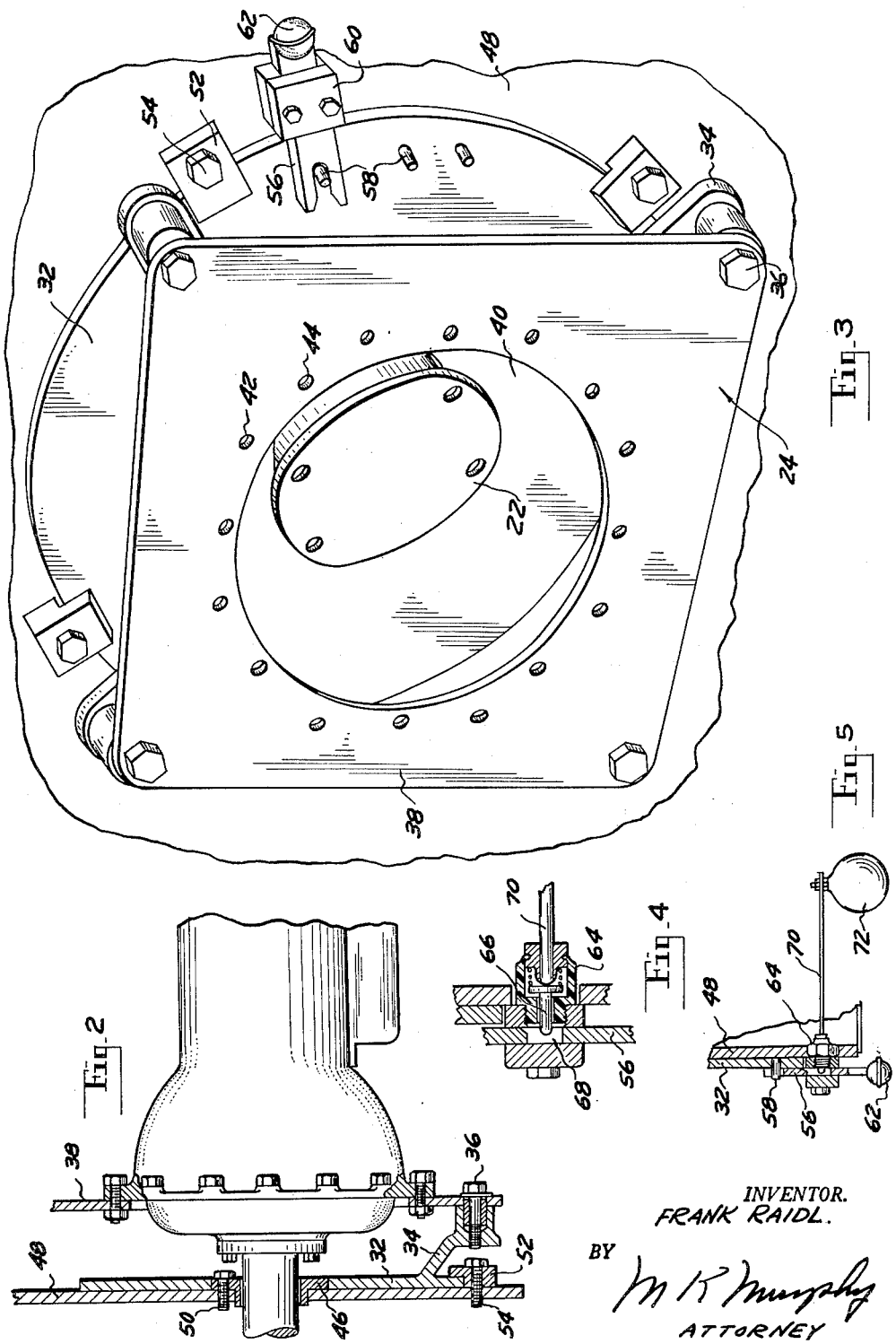
INVENTOR.
FRANK RAIDL.
BY
M. R. Murphy
ATTORNEY

United States Patent Office 3,016,740
Patented Jan. 16, 1962

3,016,740
TURRETED HEADSTOCK FOR TRANSMISSION
TEST STANDS
Frank Raidl, 3125 Fullerton Ave., Chicago 47, Ill.
Filed Dec. 7, 1959, Ser. No. 857,719
1 Claim. (Cl. 73—118)

This invention relates to powered equipment for universal use wherein a variety of adaptations are necessary and specifically to equipment such as Universal Test Machines where the units to be adapted vary greatly in mounting dimensions—for example, an automatic transmission testing machine such as described in pending application Serial No. 754,257, filed August 11, 1958, by Carroll J. Lucia.

The practical usefulness of a machine of the above type is limited greatly by costs, complications and excess labor cost in changing the adapting system.

It is the prime object of this invention to greatly simplify the adapter system to lower initial cost of adapters and to lower the labor cost of changeover to accommodate the unit to be tested.

Another object is to provide safety latch means for mounting the unit to be tested on the test machine, said means preventing operation of the machine unless the unit is latched thereby lessening the danger of damage to the unit and machine through careless mounting technique.

It is a further object of this invention to lessen the difficulty of aligning the mounting holes when installing the unit on the testing machine.

It is an object of this invention to provide a variety of mounting positions thereby improving the accessibility to the various parts of the unit under test or under repair while mounted on the test machine.

These and further objects of this invention will become apparent from the following full description of the attached drawings, in which:

FIGURE 2 is an enlarged sectional view of my improved headstock;

FIGURE 3 is an isometric view of a typical headstock showing an example of the mounting hole system pattern which this invention permits;

FIGURE 4 is a detail of the safety latch used in connection with the headstock; and FIGURE 5 is an enlarged sectional detail of the switch which forms part of the safety latch.

Referring to the drawings for a complete description of the present invention, like reference numerals define like parts throughout the various views.

Figure 1:
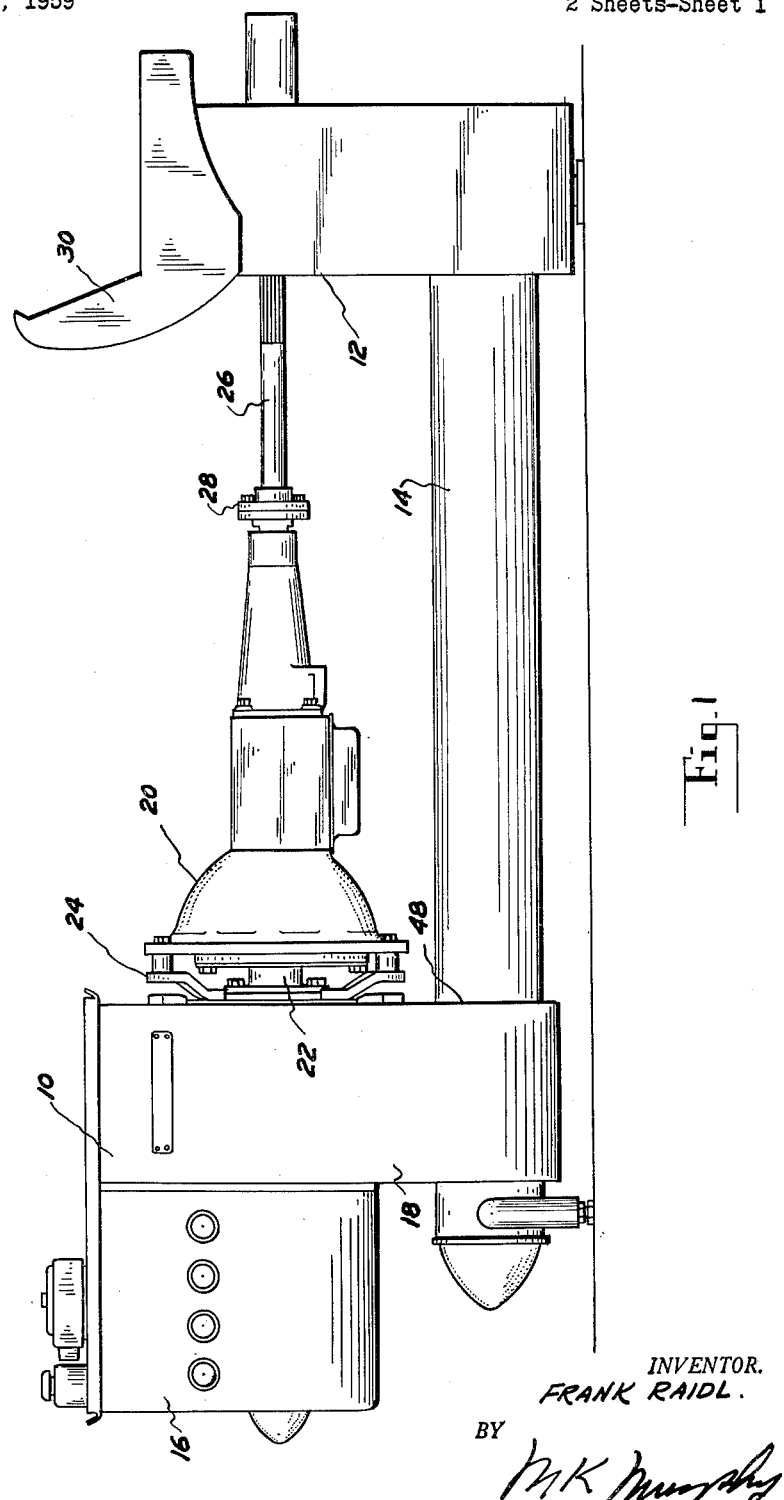
FIGURE 1 is an elevation of a test machine of the type under consideration.

FIGURE 1 shows the transmission testing machine in left hand elevation with reference to the tailstock end of the machine. The tester comprises a headstock end 10 and a tailstock end 12 which are structurally interconnected by an elongated rigid frame member 14. The head end carries a prime mover, preferably an internal combustion engine, which is disposed in the housing portion 16. The housing portion 18 contains a heavy flywheel which may be drivingly coupled to the engine for simulating actual driving conditions when testing the transmission as more fully explained in the Lucia application above referred to.

The internal drive train of the automatic transmission 20 which is under test is drivingly connected to the engine and flywheel by a flanged stub shaft 22. The transmission assembly itself is supported at the head end by my improved headstock 24 and at the tail end by a tailstock shaft 26 which is coupled to the transmission tail shaft by flange 28. A console 30 mounts suitable controls and instruments for conducting the test.

The machine is adapted to test all makes of automatic transmissions on the market, the different makes being mounted on the test machine by means of adaptors which accommodate the varying sizes. The most important adapting fixture is the headstock. With my improved turreted headstock, mounting of any of the automatic transmissions now on the market is quickly and easily accomplished, and it is possible to turn the entire transmission assembly through 360° thereby making it possible to make adjustments on the transmission without removing it from the test machine.

Referring now to FIGS. 2, 3 and 5, it may be seen that the headstock 24 comprises a disc 32 having a central opening. The disc is provided with a plurality of arms 34 which may be cast integrally with the disc or otherwise fixed thereto. These arms extend radially and axially of the disc and are provided with threaded holes for receiving the bolts 36.

A mounting plate 38 which may be of any suitable configuration is secured to the arms 34 by the bolts 36. The plate has a large central opening 40 and a plurality of small openings 42, 44, etc., which surround the central opening.

The disc 32 is revolvably mounted on a bearing support 46 which is secured to the bulkhead 48 by bolts 50. The disc is secured against axial displacement by a plurality of lugs 52 which are attached to the bulkhead by bolts 54.

A latch 56 carried by the headstock bulkhead 48 has a slot for engaging pins 58 carried by the disc 32. The latch is slideable in a housing 60 and has a knob 62 for manual engagement.

The small holes 42, 44, etc., in the plate 38 are located such that certain of them will align with the bolt holes in the transmission casings of the various models of automatic transmissions. It is desirable that the transmission be disposed upright in substantially normal operating position during testing. If the particular transmission under test is inclined from normal position after mounting on the headstock, it may be adjusted to normal position by withdrawing the latch 56 and rotating the disc 32. The latch may then engage the proper pin 58 to position the tranmission properly.

To make sure that the test machine is not operated with the latch 56 in withdrawn position, which might damage the transmission or the test machine or injure the operator, I have provided a safety switch 64 which is mounted in the bulkhead 48. This switch (FIGS. 4 and 5) has a spring pressed plunger 66 which is reciprocably mounted in an insulating casing. The latch member 56 is provided with a slot 68 into which the outer end of the plunger extends when the latch is in latched position as shown. Withdrawal of the latch from engagement with one of the pins 58 will cause the solid portion of the latch to engage the plunger and move it into engagement with a conductor 70. The conductor 70 leads to the ignition coil 72 of the engine which drives the test machine, and thus when the plunger 66 is depressed the coil 72 will be grounded or shorted out and the engine will not run. Thus, whenever the latch 56 is withdrawn to change the position of a transmission assembly on the machine, the test driving engine will be stopped, and injury or damage is prevented.

I claim:

In an apparatus for testing automative transmission assemblies which includes means for mounting a transmission assembly on the apparatus and for operating the assembly under simulated running conditions, a prime mover for driving the transmission, a headstock carried by said apparatus comprising a disc member, a mounting plate supported on said disc member in axially spaced relation thereto having a plurality of spaced holes therein, certain of said holes being adapted for alignment with the mounting bolt holes of transmission assemblies of various makes and models, means mounting said headstock for rotation through 360°, latch means for latching said headstock in a plurality of selected rotative positions, a switch operatively connected with said latch, and means operated by said switch for rendering said prime mover operable only when said latch is in latched position.

References Cited in the file of this patent

UNITED STATES PATENTS

| | | |
|---|---|---|
| 1,975,007 | Kingsbury | Sept. 25, 1934 |
| 2,079,323 | Kokotiak | May 4, 1937 |
| 2,337,707 | Bochenek | Dec. 28, 1943 |
| 2,388,425 | Lund | Nov. 6, 1945 |
| 2,665,614 | Reip | Jan. 12, 1954 |
| 2,741,830 | Lewis | Apr. 17, 1956 |
| 2,918,822 | Mann | Dec. 29, 1959 |